US012712827B1

(12) United States Patent
Mohammed

(10) Patent No.: US 12,712,827 B1
(45) Date of Patent: Aug. 18, 2026

(54) MANAGING OUT OF ORDER BUFFERS

(71) Applicant: Marvell Asia Pte Ltd, Singapore (SG)

(72) Inventor: Abdul W. Mohammed, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 643 days.

(21) Appl. No.: 18/102,435

(22) Filed: Jan. 27, 2023

Related U.S. Application Data

(60) Provisional application No. 63/391,348, filed on Jul. 22, 2022.

(51) Int. Cl.

| | |
|---|---|
| ***G06F 3/00*** | (2006.01) |
| ***H04L 47/43*** | (2022.01) |
| ***H04L 49/103*** | (2022.01) |
| ***H04L 49/901*** | (2022.01) |

(52) U.S. Cl.
CPC ............ *H04L 49/103* (2013.01); *H04L 47/43* (2022.05); *H04L 49/901* (2013.01)

(58) Field of Classification Search
CPC ...... H04L 49/103; H04L 47/43; H04L 49/901
See application file for complete search history.

(56) References Cited

U.S. PATENT DOCUMENTS

2010/0014539 A1* 1/2010 Kogata .................. H04L 49/90 370/412
2010/0054272 A1* 3/2010 Iwamoto .............. H04L 49/351 370/428
2011/0274414 A1* 11/2011 Nemiroff .............. G11B 27/28 386/331
2012/0026838 A1* 2/2012 Koike .................... G10L 21/00 367/137
2014/0040679 A1* 2/2014 Shimizu ............. G06F 11/0745 714/54
2024/0073869 A1* 2/2024 Oh ....................... H04W 72/04

* cited by examiner

*Primary Examiner* — Henry Tsai
*Assistant Examiner* — Kim T Huynh
(74) *Attorney, Agent, or Firm* — Hamilton, Brook, Smith & Reynolds, P.C.

(57) ABSTRACT

A method and corresponding computer device for a shared buffer able to consecutively store received data packets without wasted storage space and enabling first-in first-out processing order. The shared buffer is divided into segments, each segment having a complete count that tracks both number of data packet stored into the segment and the number of data packets read out of the segment. The complete counts of the segments provide a way to determine if segments contain unprocessed data packets and when the segments become free to store newly received data packets. Managing the shared buffer on a segment level, instead of a data packet level reduces the amount of memory needed to be dedicated to buffer management and streamlines the packet tracking and release procedures.

20 Claims, 8 Drawing Sheets

MANAGING OUT OF ORDER BUFFERS

RELATED APPLICATION

This application claims the benefit of U.S. Provisional Application No. 63/391,348, filed on Jul. 22, 2022. The entire teachings of the above application are incorporated herein by reference.

BACKGROUND

Information is transferred between applications, components and/or devices in the form of data packets, a unit of communication over a digital network. Often, the rate at which data packets are received at a given destination within the digital network is greater than the rate at which they can be processed, resulting in a backlog of received but not processed data packets. Buffers are a dedicated region of memory used to temporarily store and organize received data packets before they are processed. With the ever-increasing speed and volume of communications within and between digital networks, optimizing the efficiency in how exchanged data packets are received, temporarily stored, and processed is essential. A need exists for a simplified and streamlined method for managing, storing, and processing received data packets using a buffer that reduces memory requirements and eliminates the need for buffer management software.

SUMMARY

Embodiments of the present disclosure include methods and corresponding systems that provide an alternative to the use of a series of fixed size single packet storing buffers and instead enable data packets to be written consecutively into a shared buffer as they are received. This ensures that no memory space is wasted as there is no space between packets stored in the shared buffer. Furthermore, it simplifies the memory freeing mechanism of the buffer by eliminating the need to keep track of a linked list of free buffers and enabling sequential reading/writing in a first-in first-out (FIFO) order without out of order buffer usage. Finally, it reduces the memory space and processing powered needed to be dedicated to buffer management by also eliminating the requirement to track the size and locations of all packets stored in the buffer(s) and being implementable as hardware logic without supplemental software.

Embodiments of the invention include, a computing device comprising a first storage area configured to temporarily store data packets consecutively, the first storage area divided into at least two segments and a second storage area configured to store, for each of the at least two segments, a complete count, the complete count indicating if a corresponding segment contains unprocessed data packets. The computing device further including a write controller configured to generate a write message when a data packet is stored in the first storage area and update complete counts of a first subset of the at least two segments, the first subset of the at least two segments selected based on the generated write message. The computing device also including a buffer controller configured to receive a read message when a data packet is processed and update a second subset of the at least one segments, the second subset of at least one segments selected based upon the received read message and update an address of the packet start read pointer located in a current segment to a subsequent segment when the complete count of the current section indicates that it does not contain unprocessed data packets.

The second storage area of the computing device may be further configured to store, for each of the at least two segments, a flat and the write controller further configured to set the flag for a segment to full when a packet start write pointer crosses an end boundary of that segment and delay updating the address of the packet start read pointer to the subsequent segment until the flag for the subsequent section is set to full. In such embodiments, the buffer controller can be further configured to clear the full flag for a segment when the complete count of that segment indicates that the that segment does not contain unprocessed data packets.

The write message may comprise i) a packet start write pointer, ii) a length of the stored data packet, iii) a segment number identifying a segment containing a start of the stored data packet; and iv) a straddle count identifying a number of segments containing the stored data packet. The segment number and the straddle count of the stored data packet can be calculated based upon the packet start write pointer and the length of the stored data packet.

The read message may comprise a segment number and a straddle count of the processed data packet. In some embodiments, at least one of the write controller and buffer controller is a hardware controller.

The second storage area can be further configured to store a number of the at least two segments and a size of the at least two segments. The first storage area may be configured to store data packets consecutively without any intervening empty space. Data packets can be stored in, and processed from, the first storage area in first-in, first-out order.

Embodiments of the invention also include a method for temporarily storing data packets comprising consecutively storing, in a first storage area divided into at least two segments, received data packets and storing, in a second storage area, for each of the at least two segments, a complete count, the complete count indicating if a corresponding segment contains unprocessed data packets. The method further includes generating, by a write controller, a write message when a data packet is stored in the first storage area and updating, by the write controller, complete counts of a first subset of the at least two segments, the first subset of the at least two segments selected based on the generated write message. The method concludes by receiving, by a buffer controller, a read message when a data packet is processed, updating, by the buffer controller, a second subset of the at least one segments, the second subset of at least one segments selected based upon the received read message, and updating, by the buffer controller, an address of the packet start read pointer located in a current segment to a subsequent segment when the complete count of the current section indicates that it does not contain unprocessed data packets.

If the second storage area is further configured to store, for each of the at least two segments, a flag, the method can further include setting, by the write controller, the flag for a segment to full when a packet start write pointer crosses an end boundary of that segment and delaying the updating of the address of the packet start read pointer to the subsequent segment until the flag for the subsequent section is set to full. In such embodiments, the method may further include clearing, by the buffer controller, the full flag for a segment when the complete count of that segment indicates that the that segment does not contain unprocessed data packets.

Embodiments of the invention also include a computing device comprising means for temporarily storing packets consecutively in a first storage area divided into at least two segments and means for storing, in a second storage area, for each of the at least two segments, a complete count, the complete count indicating if a corresponding segment contains unprocessed data packets. The computing device further includes means for generating a write message when a data packet is stored in the first storage area and updating complete counts of a first subset of the at least two segments, the first subset of the at least two segments selected based on the generated write message and means for receiving a read message when a data packet is processed and updating a second subset of the at least one segments, the second subset of at least one segments selected based upon the received read message. Finally, the computing device includes means for updating an address of the packet start read pointer located in a current segment to a subsequent segment when the complete count of the current section indicates that it does not contain unprocessed data packet.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
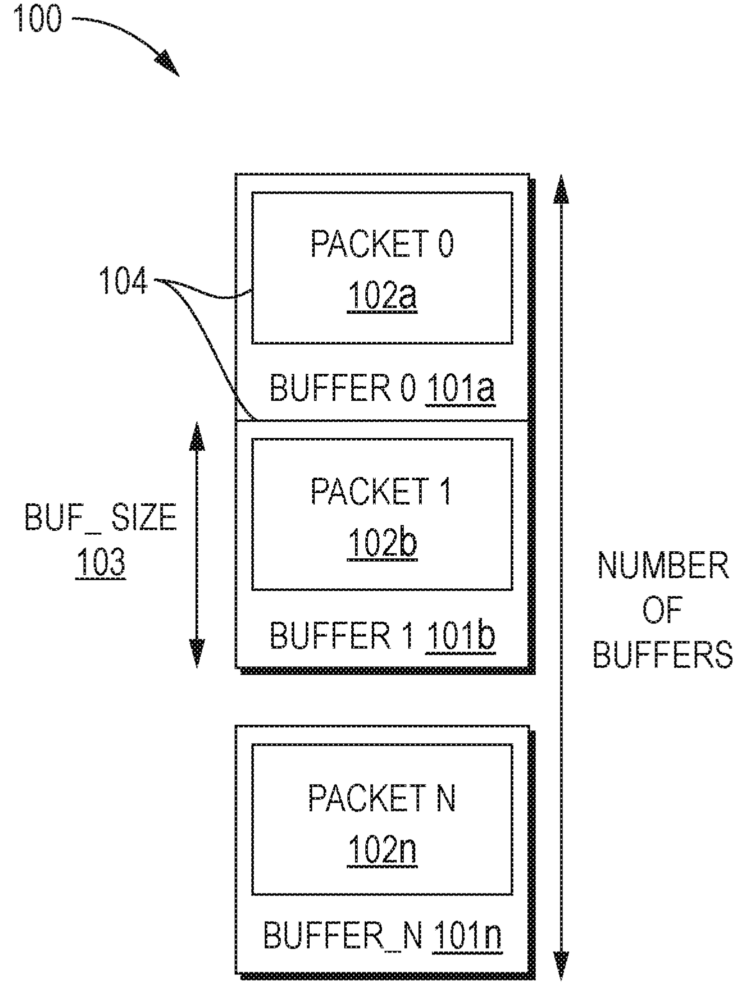
FIG. 1 is a diagram of a series of buffers utilized by prior art methods.

A description of example embodiments follows.

In prior art methods and systems, memory devices use a series of buffers of a set buffer size, the buffer size corresponding to the largest received data packet. Each buffer is configured to store a single received packet; this results in significant waste in memory space as data packets are necessarily smaller than the buffer they are stored in. To track and process the received data packets, memory space outside of the buffers is used to store the packet length and start pointer for each received buffer. The start pointer can be in the form of the memory address identifying the starting location in the memory space comprising the buffers of the start of the packet.

After a packet in a buffer is processed, the buffer is returned to the free pool and is available to store a new data packet. Multi-processor systems are capable of simultaneously processing multiple packets stored in different buffers. This results in out of order processing of data packets and requires the use of software managing and tracking which buffers have stored data packet waiting to be processed and which buffers are free to store newly received packets. This software further increases memory and processing requirements.

It should be understood that a data packet, as referenced herein, may be any unit of communication over a digital network. Such a digital network may be referred to interchangeably herein as a computer network or, simply, a network, and may be any type of computer network, such as a local area network (LAN) or wide area network (WAN), for non-limiting example. The network may be a wired-network, wireless network, or combination thereof. Data packets may be used in Internet Protocol (IP) transmissions. It should be understood, however, that a data packet, also referred to interchangeably herein, simply, as a packet, is not limited to an IP transmission, and that a traffic stream (flow), as referenced herein, includes at least one packet sent from a source to a destination.

The term "buffer" as used herein is a set amount of memory or other physical storage medium, including but not limited to a dedicated region of a larger memory, used to temporarily store received packets before they are processed. The term buffer includes fixed memory locations in hardware as well as software implemented virtual data buffers pointing to a variable location. The term buffer includes memory located on a chip (or other packet receiving destination) or memory external to the chip. A buffer can be used to manage packet transmission between any device, component, or application in a digital network, including but not limited to data received and sent by input/out (I/O) devices, to and from other computing devices in a network, and between processes/elements of a single computing device.

The phrase "processing a data packet in a buffer" and/or equivalent phrases as used herein means that a received data packet stored in a buffer has been utilized at its destination. This includes but is not limited to the following actions: being written into a different, often more permanent, memory, outputted by an I/O device, accessed and utilized by a processor, and forwarded to a subsequent destination. A person skilled in the art would understand that there any many different ways to utilize a received data packet at a destination including but not limited to those explicitly listed previously. After a data packet is processed, the location where it is stored in the buffer can be deleted or overwritten and is considered "free" and available to store newly received data packets.

The term "pointer" as used herein is a stored value that identifies or "points to" a location in a memory, including but not limited to a location in a buffer. A pointer can be used as the address of a specific memory location and be used in combination with specific memory functions. For example, a read pointer identifies and tracks the location/address from which data is being read out of a memory/buffer. Similarly, a write pointer identifies and tracks the location/address to which data is being written into a memory/buffer. A start point identifies and tracks the location/address corresponding to a start of a data packet stored in a memory/buffer.

FIG. 1 is a diagram of a series 100 of buffers 101 utilized by prior art methods. Prior art methods of temporary packet storage utilize a series of buffers 101$a$, 101$b$, . . . 101$n$ (collectively 101) of a fixed buffer size 103. The series of buffers 101 receive packets 102$a$, 102, . . . 102$n$ (collectively 102) from the digital network and store them until they can be processed. Buffer size 103 is selected based upon the largest packet 102 expected to be received by the series 100 of buffers 101. As each buffer 101 stores a single packet 102, e.g. buffer 101*a* stores packet 102*a*, any packet 102 smaller than buffer size 103 results in wasted space 104 in the buffer 101 used to store it.

Packets 102 are originally stored in buffers 101 in the order they are received. For example, packet 0 102*a* is storied in buffer 0 101*a*. Subsequently received packet 1 102*b* is stored in buffer 101*b* and so on for packet N 102*n* stored in buffer N. Which buffer 101 to store, by writing into its memory location/address, a received packet 102 can be tracked using a write pointer that iteratively moves from buffer to buffer. Similarly, packets 102 stored in buffers 101 can also be processed in the order they are received. Which buffer 101 to process, by reading out of its memory location/address, a stored packet 102 can be tracked using a read pointer that iteratively moves from buffer to buffer. This can be described as first-in first-out order or "FIFO."

However, in multi-processor systems multiple packets 102 stored in different buffers 101 of the series 100 can be processed simultaneously. This prevents a simple application of FIFO processing order as some packets 102 are processed faster than others, resulting in buffers 101 becoming free "out of order." Using the series 100 of buffers 101 storing packets 102 shown in FIG. 1 as an example, packet 0 102*a* in buffer 0 101*a* and packet 1 102*b* in buffer 1 101*b* can be processed simultaneously by different processors. Packet 1 102*b* is smaller than packet 0 102*b* which results in it being processed first and buffer 1 101*b* becoming free before buffer 0 101*a*. This prevents iterating read/write pointers sequentially between buffers 101 to facilitate FIFO order processing as buffers 101*a*, 101*b* become "free" out of order and a newly received packet 102 would be stored in buffer 1 101*b* before a subsequently newly received packet 102 would be stored in buffer 0 101*a*. This necessitates, that a complex linked list of free buffers 101 in series 100 be maintained and updated as packets 102 are continuously received, stored, and processed into and out of buffers 101. Furthermore, the "next free buffer" in this linked list of free buffers 101 into which a next received packet 102 will be written and stored must also be identified. These tasks often require external buffer management software increasing the memory and processing power requirements of any system utilizing the prior art method of a series 100 of buffers 103. This, in addition to wasted space 104, is an inefficiently of prior art methods and systems addressed by embodiments of the present disclosure.

Figure 2:
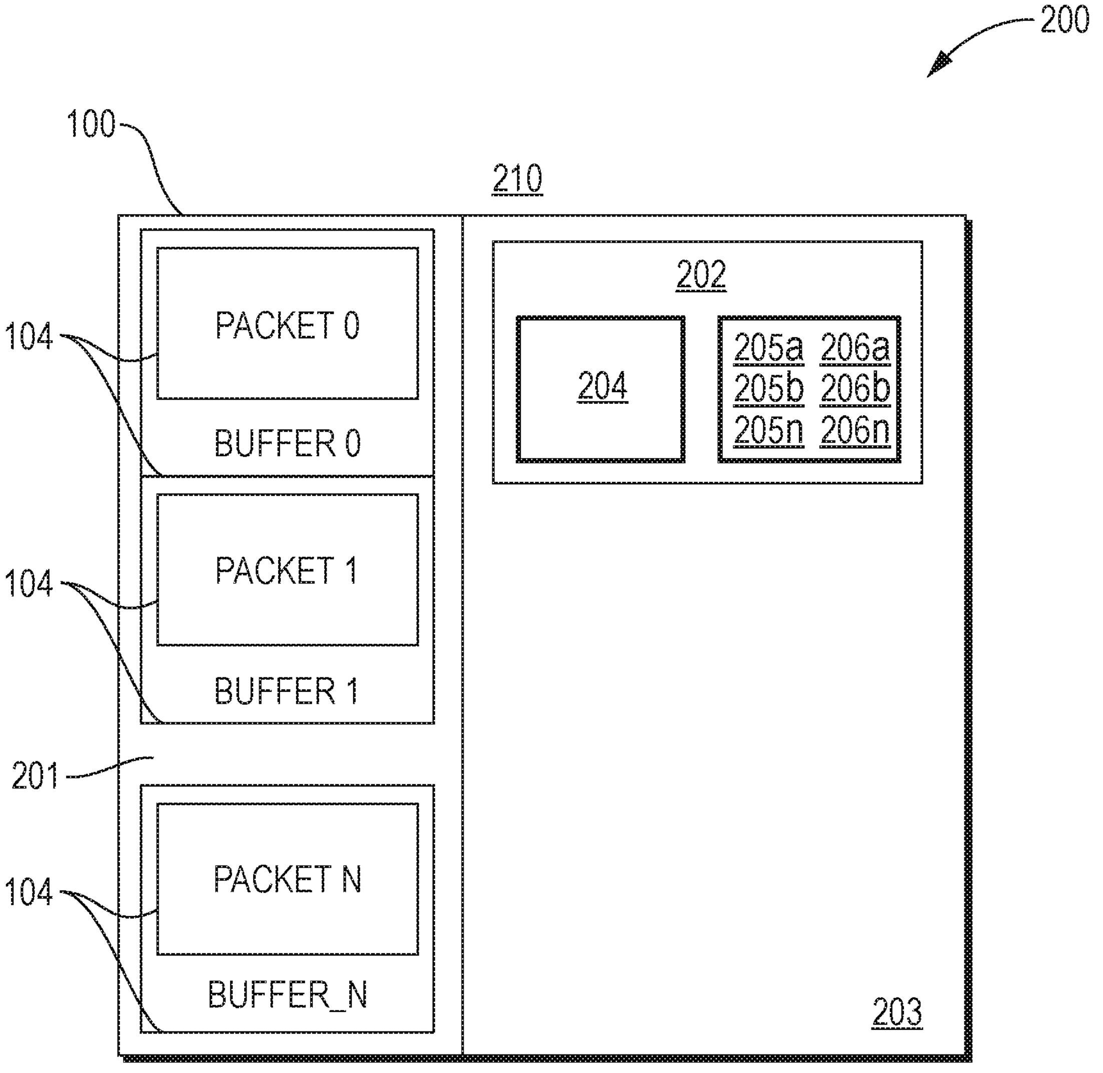
FIG. 2 is a diagram of a prior art memory system utilizing the series of buffers shown in FIG. 1.

FIG. 2 is a prior art memory system 200 utilizing the series 100 of buffers shown in FIG. 1. Memory system 200 contains memory space 210. Memory space 210 may be comprised of any number memory storage devices of any known type. Memory space 210 is divided into different sections, a buffer section 201, a buffer management section 202, and a remainder section 203. The sections 201, 202, 203 are not necessarily continuous, as shown in FIG. 2, but could be distributed throughout any location in memory space and in any storage device(s) comprising memory system 200. Buffer section 201 is the part of memory space 210 that operates as buffer(s). Buffer management section 202 is the part of memory space 210 that saves data relevant to operation the buffers in Buffer section 201. Remainder section 203 is the part of memory space 210 utilized for non-buffer related functions. To optimize the utility of memory system 200, the size of remained section 203 should be maximized while the size of buffer section 201 and buffer management section 202 should be minimized.

Prior art methods, utilizing series 100 of buffers, fail to minimize buffer section 201 because of the creation of wasted space 104. Prior art methods, utilizing series 100 of buffers, also fail to minimize buffer management section 202. First, because part of buffer management section 202 may need to be used to save and operate buffer management software 204 used to maintenance a linked list of free buffers in series 100 of buffers and establish FIFO packet processing order. Second, for each packet received and stored in the series 100 of buffers, memory device 200 stores in buffer management section 202, a start pointer 205*a*, 205*b* . . . 205*n* (collectively 205) and length of packet value 206*a*, 206*b* . . . 206*n* (collectively 206). This information is required by a processor to identify the location and extent of a stored packet for processing. At least to the difference between packet size and buffer size and resulting wasted space 104, the processor cannot calculate the exact location of a packet in the series 100 of buffers without the stored start pointers 205 and packet length 206. As start pointers 205 and packet length 206 are stored for every packet, this greatly increases the required size of buffer management section 202.

Figure 3:
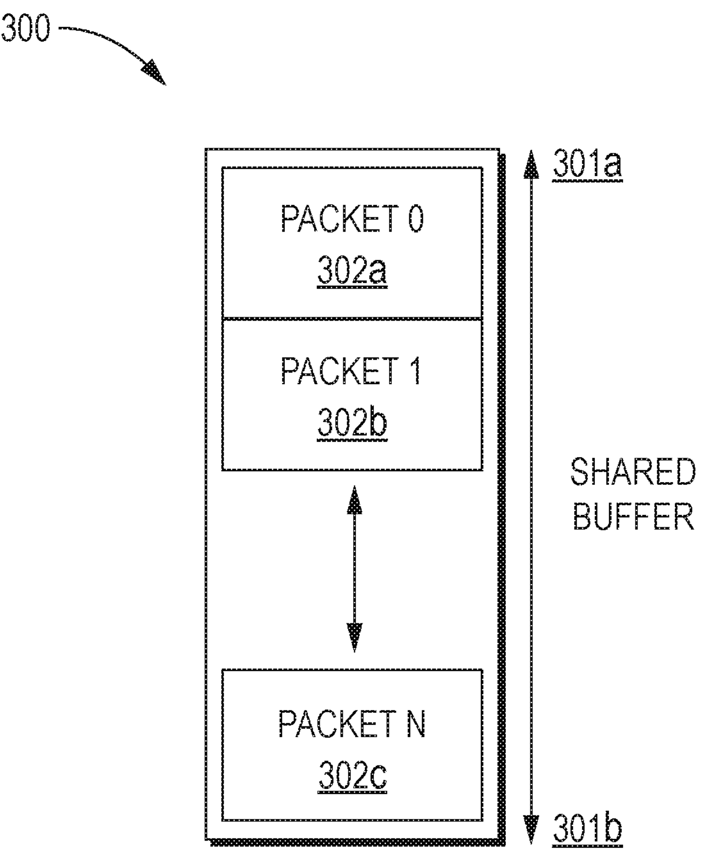
FIG. 3 is a diagram of a shared buffer utilized by embodiments of the present disclosure.

FIG. 3 is a diagram of a shared buffer 300 utilized by embodiments of the present disclosure. In contrast to prior art methods that utilize a series 100 of buffers 101 each storing a single packet 302, embodiments of the present disclosure utilize a unitary shared buffer 300 that stores all received packets 302*a*, 302*b* . . . 302*n* (collectively 302). This saves memory space as packets 302 can be stored consecutively as they are received, eliminating wasted space 104. This assists in minimizing the size of Buffer section 201, shown in FIG. 2. Buffer 300 can be located on internal chip memory or external chip memory.

The shared buffer 300 also simplifies the packet or memory freeing mechanism (the procedure in which memory space on the buffer is denoted as "free" and made available to stored new incoming packets after the previously stored packet is processed). This provides the following three benefits, 1) it eliminates the need to track and maintained a linked list of free buffers, 2) it reduces the amount of memory space required to be dedicated to buffer management by eliminating the need to store, on a per packet basis, a start pointer and packet length, and 3) it enables sequential reading/writing in FIFO order from shared buffer 300 top 301*a* to its bottom 301*b* (or vice-versa) with no out of order memory utilization. This is accomplished by a novel method of tracking received and processed packets 302 in the shared buffer 300 that simplifies packet specific data (e.g. start pointer and length) to a set of counters, wherein each packet processed or received increases or decreases the counter value. This results in a reduction in the amount of stored data. Furthermore, this process can be controlled and managed using only hardware based logic, replacing the need for heavyweight processor and memory insensitive buffer management software. This assists in minimizing the size of buffer management section 202, shown in FIG. 2.

Figure 4:
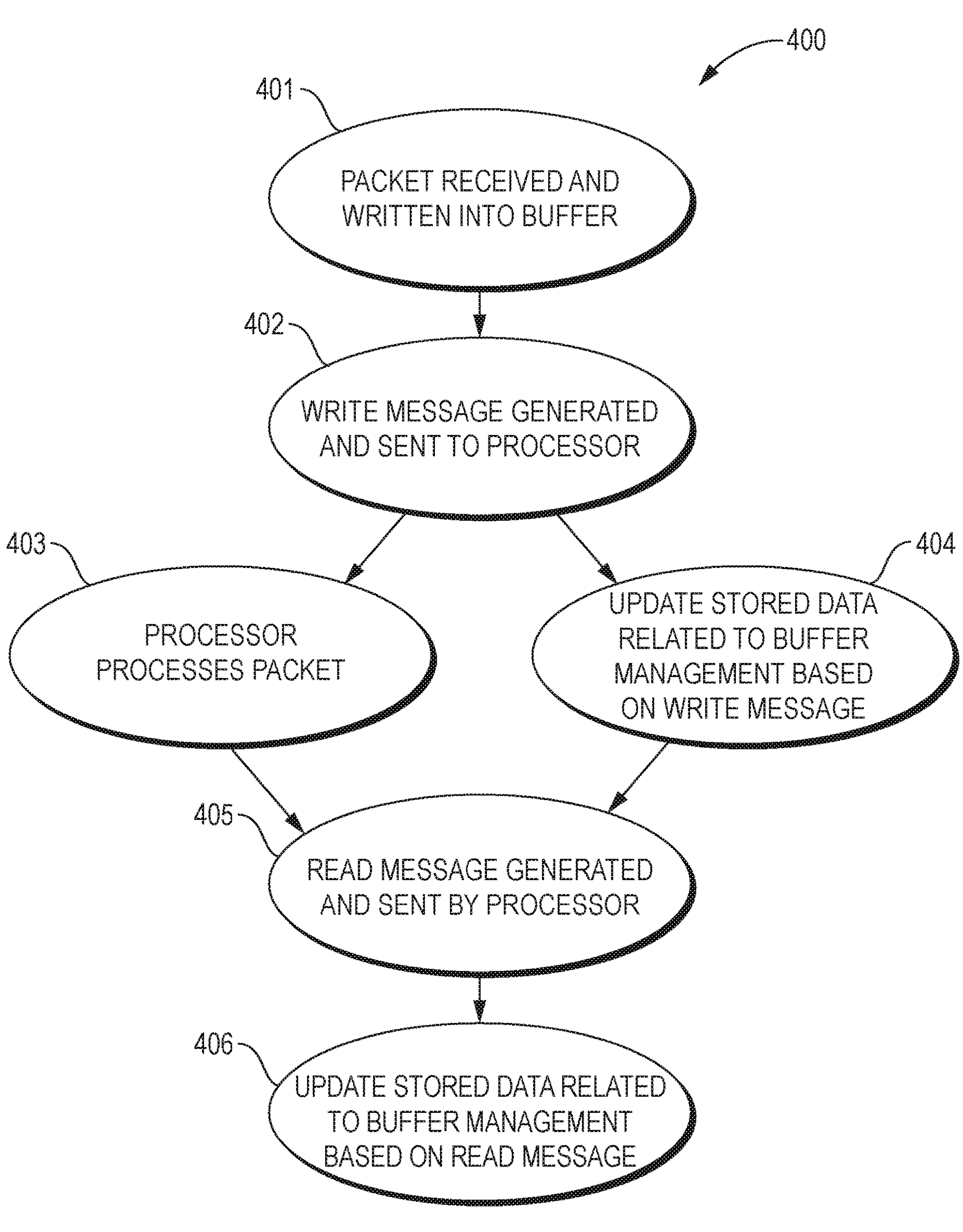
FIG. 4 is a flow chart of a process for receiving and processing packets utilizing a buffer.

FIG. 4 is a flow chart of a process 400 for receiving and processing packets utilizing a buffer. Process 400 can be performed by any computing device consisting of at least one memory device and at least one processor. The memory device(s) and processor(s) can be any know type of memory device and processor and interfaced by any known method. For non-limited example the processors may be ARM processors and DSP processors located on the chip operating the buffer. In step 401, a packet is received at a computing device from a digital network and is written into a buffer.

This may be shared buffer 300, shown in FIG. 3. The packet can be written into a buffer at a location/address indicated by a write pointer stored in the memory of the computing device. Subsequently in step 402, the computing device, using a write controller, generates a write message containing information about the stored packet and sends it to at least one processor. The at least one processor processes the packet 403 in steps 403. The packet can be processed/read out of the buffer at a location/address indicated by a read pointer stored in the memory of the computing device. Step 401, receiving and writing a packet into a buffer, and step 403 reading out and processing a packet from a buffer, can be performed simultaneously and independently for multiple different packets stored at different locations in the buffer.

In step 404, the stored data related to buffer management is updated based on the write message and to indicate that the location in the memory serving as the buffer storing the packet is "full" and not available to store newly incoming buffers or be used for other purposes. The stored data can include additional information regarding the received packet for use in debugging and other processes separate from the main buffer management routine. After the packet is processed in step 403, the processor generates a read message in step 405 that is received by a read controller and used to update the stored data related to packet management in 406 to indicate that the location in the memory serving as the buffer storing the received packet is now "free" and is available to store newly incoming packets or be used for other purposes. Embodiments of the present disclosure utilize a novel format for the write message, read message and stored data related to buffer management to simplify process 400 and reduce the required memory and processing power and enable sequential FIFO order for received packets during step 401 ("in" or write/store step 401) and step 403 ("out" read/process).

Figure 5:
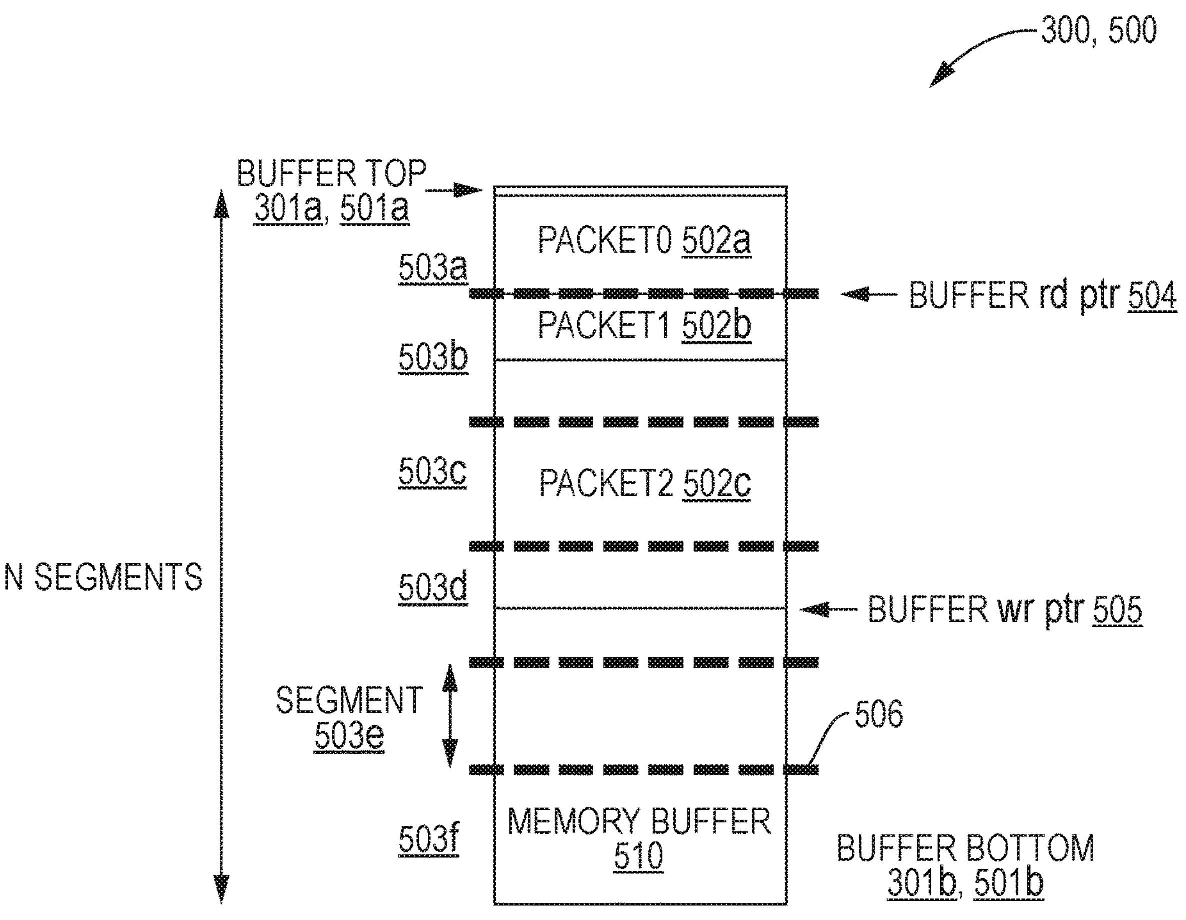
FIG. 5 is a detailed diagram of a shared buffer utilized by embodiments of the present disclosure.

FIG. 5 is a detailed diagram of a shared buffer 300, 500 utilized by embodiments of the present disclosure. FIG. 5 is a representation of the memory space of shared buffer 500, with data storage capacity being represented by two-dimensional area and a specific memory location/address being represented by a location on a one-dimensional vertical axis. Shared buffer 500 receives and stores packets 502*a*, 502*b*, 502*c* (collectively 502) consecutively without any space between them. Space 510 represents the "free" memory of buffer 500 that does not store any packets 502 waiting to be processed and is able to store newly received packets 502. Received packets 502 are stored and written into the buffer at a location indicated by buffer write pointer 505 that moves from buffer top 501*a* to buffer bottom 501*b*. When buffer write pointer 505 reaches the buffer bottom 501*b* it moves to buffer top 501*a*.

Shared buffer 500 is virtually divided into segments 503*a*-*f* (collectively 503) as indicated by boundary lines 506. Segments 503 are not physically divided and do not change the unitary nature of buffer 500. Packets 502 can be stored across boundary lines 506 and inside multiple buffer segments 503. For example, packet 2 502*c* is stored in segments 503*b*, 503*c*, and 503*d*. Packets 502 can also be stored entirely inside a single buffer segment, for example, packet 1 502 is located entirely within buffer segment 503*b*. Increasing the number of segments 503 reduces buffer memory waste but increases the data storage requirements for buffer management. The number of segments can be manually set by an operator or an optimal number can be determined and selected using software.

Buffer read pointer 504 indicates the address/location from which packets 502 are processed out of buffer 500 and is used to track which segments 503, and their stored packets 502, have been processed. The buffer read pointer 504 is updated to point to the boundary 506 of a subsequent segment 503 after all of the packets 502 in its current segment 503 have been processed. In FIG. 5, buffer read pointer 504 is located at the start of segment 503*b*, indicating that all packets in segment 503*a* (e.g. packet 0 502*a*) have been processed. Segment 503*a* can then be considered "free" and part of space 510 and reused to store new received packet when buffer write pointer 505 returns. The next packets 502 to be processed are packets (partially or wholly) in the section now indicated by buffer read pointer 504, e.g. packet 1 502 and packet 2 502*c* in section 503*b*. When to move buffer read pointer 504 to a subsequent section 503 of shared buffer 500 can be determined by the novel read and write messages generated by embodiments of the present disclosure and how they are used to update the stored data related to buffer management.

In contrast to prior art methods, which tracks and stores packet information, e.g. packet start pointers and length, embodiments of the present disclosure manage shared buffer 500 by tracking information on a section 503 level. As each section 503 can contain multiple packets 502, this reduces the amount of data stored and therefore, the dedicated memory space required for buffer management.

Embodiments of the present disclosure, store and manage, for each section 503, a count (a "completed count") that is incremented for each packet written into/stored in that section and decreased for each packet read out/processed from that section. Packets 502 that are stored across multi sections 503 increment the count when stored and decrease the count when processed for all sections 503 they are stored in. When the completed count of a section 503 returns to its resting value (e.g., 0), it indicates to the computing device that that section 503 no longer contains any packets 502 that need to be processed and can be marked as "free." Buffer read pointer 504 is then triggered to move to a subsequent section 503. In an alternative embodiment, two counts are stored per section 503, one increasing when a packet is written and the other increasing when a packet is processed and a section is indicated as "free" and buffer read pointer 504 moved when the counts are equal.

Referring to FIG. 5, the complete count of section 503*a* would be 0 as packet 0 502*a*, as indicated by the locations of buffer read pointer 504 and write pointer 5050 has been written (incrementing the count by 1) and processed (decreasing the count by 1). The completed count of section 503*a* would be 2 as packet 1 502*b* and packet 2 502*c* have been written but not yet processed, increasing the count by 2 but not decreasing it by any value. After packet 1 502*b* and packet 2 502*c* are processed the completed count of both section 503*b* and 503*c* (because it only contains packet 2 502*c*) return to 0 and buffer read pointer 504 is triggered to move to section 503*d*. Which sections 503 completed count to increase or decrease can be determined by the computing device based upon the information provided by the read and write messages generated as packets are processed and stored respectively.

In some embodiments, the computing device also stores a flag or "max flag" for each segment 503. When a section's flag is set, it indicates that that section is full. A flag for a section is set when the write pointer 503 crosses the section's end boundary. Referring to FIG. 5, section 503*b* and section 503*c* would have their corresponding flags set to full but section 503*d* would not as buffer write pointer 505 has not yet crossed is end boundary. The computing device can be configured to delay moving read pointer 504 to a section without a full flag, preventing the processing of packets from a segment 503 into which packets are still being written. This prevents inadvertently having an active section's completed count return to its resting value, providing a false positive that the section is "free." When the read pointer 504 is moved from a section 503, after all its packets 502 have been processed, that section's set flag can be emptied/overwritten, removing the indication that that section is full. Returning to FIG. 5, section 503*a* would have its set flag removed as read pointer 504 has moved past it and it is "free" not "full" as all its packets have been processed and no longer need to be saved in the shared buffer 500. The stored flags can also be utilized for debug and other functionalities not directly related to buffer management.

Embodiments of the present disclosure utilize information provided by write messages, generated when a packet is stored to the buffer, and read messages, generated when a packet is processed, to maintain information in a computer devices memory. This information is used to control the location of the buffer read pointer 504 and buffer write pointer 505 and subsequently where packets are being stored into the buffer and where packets are being processed out of the buffer. Embodiments of present disclosure provide an improvement upon prior art methods by tracking buffer information on a per section 503 basis rather than a per packet 502. With individual packet information being reflected only in the incremental increase or decrease of section's 504 completed count.

Figure 6A:
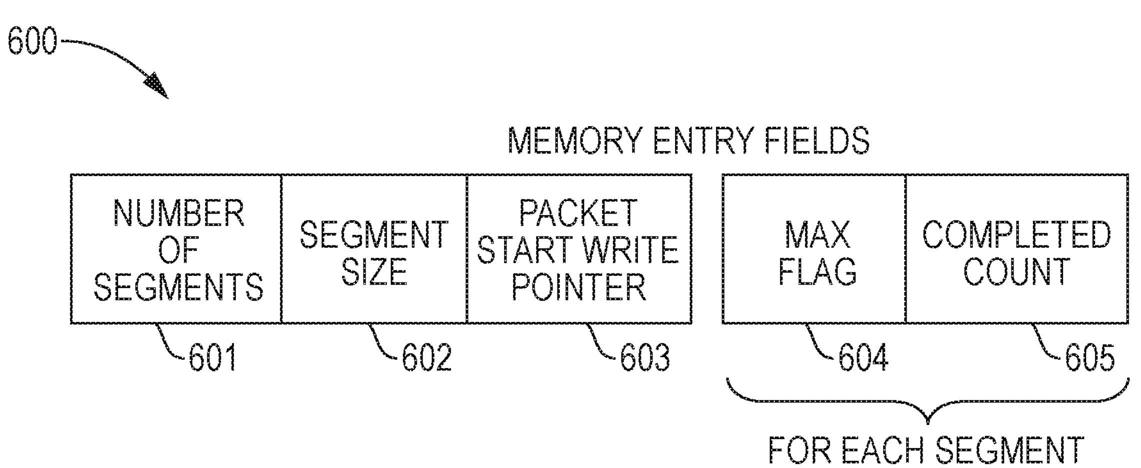
FIG. 6A is a diagram of the memory entry fields used in buffer management by embodiments of the present disclosure.

FIG. 6A is a diagram of the memory entry fields 600 used in buffer management by embodiments of the present disclosure. Memory entry fields 600 are stored by a computing device in a memory space separate from shared buffer 300, 500. The memory space used to store memory entry fields 600 can be located on internal chip memory external chip memory. Memory entry fields are divided into entries (number of segments 601, segment size 602 and packet start write pointer 603) that are stored as a single value for a given shared buffer 300, 500 and per segment entries (max flag 604 and completed count 605) that have value stored for each segment 503 of shared buffer 300, 500. The memory entry fields 600 may be stored as binary data or utilize any other alterative data storage format and method. The memory entry fields 600 may be stored in the permeant memory of a computing device utilizing shared buffer 300, 500.

The number of segments 601 records the number of segments 503 in the utilized shared buffer 300, 500. The segment size 602 records the size of the segments 503 in the utilized shared buffer 300, 500. As segments 503 are not a physical division of shared buffer 300, 500 the number of segments 601 and segment size 602 can be variable if desired. Packet start write pointer 603 stores the locations/address of write pointer 504 within shared buffer 300, 500. Max flag 604 stores, for each segment 503, an indication of if that segment is "full." Completed Count 605 stores, for each segment 503, an iterative counter that tracks the storage (by increasing by one unit) and processing (by decreasing by one unit) of packets 502 in the segments 503. Alternatively, completed count 605 may be comprised of two iterative counters that increase by one unit after the storage and processing of packets respectively. The computing device can determine all the packets in a segment 503 have been fully processed and is "free" to receive and store new packets 502 when it's completed count 605 is at its resting value. The computing device may further require the max flag 604 of the segment to be also be set to full to consider a segment 603 "free" to avoid false positives for segments 503 actively being written into. A segment's max flag 604 is set to full when the saved packet start write pointer 603 crosses the segment's end boundary. A segment's max flag 604 can be reset when the read pointer 505, crosses the segment's end boundary.

Figure 6B:
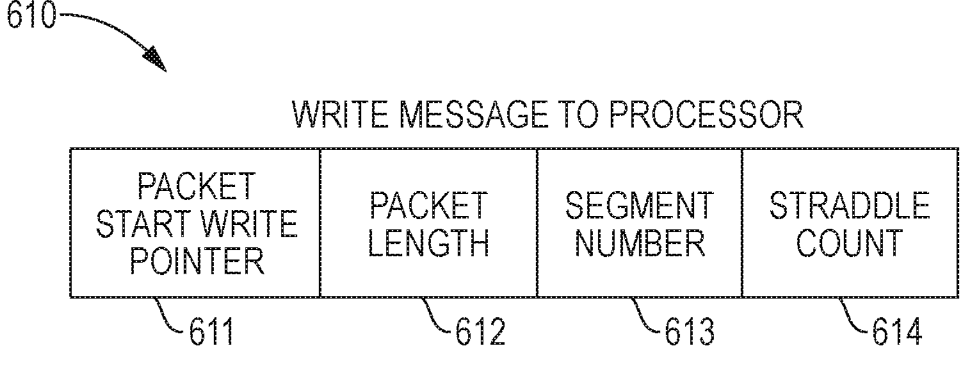
FIG. 6B is a diagram of a write message used in buffer management by embodiments of the present disclosure.

FIG. 6B is a diagram of a write message 610 used in buffer management by embodiments of the present disclosure. Write message 610 is generated by a write controller after a packet 502 is written into shared buffer 300, 500. The write controller used to generate write message 610 may be operated by at least one processor, hardware logic, or software. The write controller used to generate write message 610 may be located on the chip (or other destination) operating shared buffer 300, 500 or external to the chip (or other destination) operating shared buffer 300, 500. Write message 610 and the information it provides are used to update the memory entry fields 600. A receiving processor may also use the provided information to assist in processing the packet or forward it to a different processor/component that will process the packet.

Write message 610 includes packet start write pointer 611, packet length 612, segment number 613 and straddle count 614. Write message 610 may utilize in binary or any other data format. Packet start write pointer 611 is the address/location of the write pointer 504 at the time the packet 502 has been written into the shared buffer. Packet length 612 records the length of the stored packet 502. In prior art methods, packet start write pointer 611 and packet length 612 were included and stored in memory entry fields 600 on a per packet basis. However, in embodiments of the present disclosure, the per packet start write pointer 611 and packet length 612 information is only included in the temporary write message 610, reducing memory requirements of memory entry field 600. The per packet start write pointer 611 and packet length 612 information is used by the processor (or other component at the end destination of the packet) to process the received packet. The packet start write pointer 611 can be determined or copied from the saved packet start write pointer 603 in memory entry fields 600 at the time the received packet 502 is being starting to be written into the shared buffer 300, 500. The packet length 612 can be based upon packet header information or derived based on the difference between the packet start write pointer 611 and the current location of write pointer 505, provided by saved packet start write pointer 603 in memory field 600, at the end of the packet writing process.

In addition to packet start write pointer 611 and packet length 612, the novel write message 611 utilized by embodiments of the present disclosure also includes segment number 613, identifying the segment 503 that the saved packed 502 starts in, and the straddle count 614, how many segments the saved packet 502 is stored within. Referring to FIG. 5 as an example, a write message 610 for packet 1 502*b* would have a segment number 613 of "2" identifying its starting segment 503*b* and a straddle count 614 of "1." A write message 610 for packet 2 502*c* would also have a segment number 613 of "2" because it also starts in segment 503*b* but have a straddle count 614 of "3" because it is stored within three segments 503*b*, 503*c*, and 503*d*. The segment number 613 and straddle count 614 can be determined based upon the packet start write pointer 611 and packet length 612. Alternatively, then can also be determined based upon the packet start write pointer 611 and the difference between packet start write pointer 611 and current write pointer location 504, indicated by saved start write pointer 603 in memory entry fields 600.

The information contained in transient write message 611 is not saved directly into memory entry fields 600 but instead is used to update the stored completed counts 605, tracked at a segment 503 level. The computing device, using the segment number 613 and the straddle count 614, can determine which segment's saved completed count 605 in memory entry fields 600 should be increased in response to the write message. This determination and the subsequent updating of the saved completed counts 605 can be performed by any combination of a hardware write controller, a processor, or software program. Referring to FIG. 5 as an example, a write message 610 generated after storing packet 2 502*c* into the buffer would have a segment number 613 of "2" and a straddle count 614 of "3." The computing device would use the segment number 613 to identify the starting segment, 603*b* and the straddle count to identify and further segments also containing the saved packet, e.g. segments 603*c* and 603*d*. Therefore, in response to receiving a write message 610 with a segment number 613 of "2" and a straddle count 614 of "3," the computing device would increment the completed count 604 of segments 503*b*, 503*c*, and 503*d* by one. This is a simple and lightweight calculation, requiring limited, if any, dedicated computing power and implementable as pure hardware logic. The incrementation of the saved completed count(s) 604 can be used to track the amount and locations of packets 502 stored in shared buffer 300, 500 on a segment level. The information in write message 610 does not need to be saved as part of memory entry fields 600, reducing memory requirements.

Figure 6C:
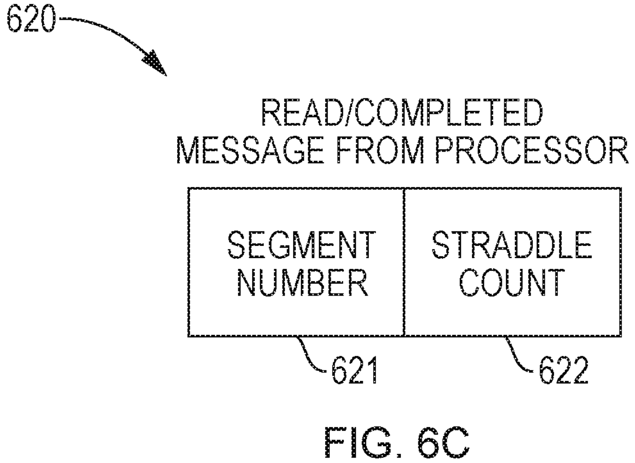
FIG. 6C is a diagram of a read message used in buffer management by embodiments of the present disclosure.

FIG. 6C is a diagram of a read message 620 used in buffer management by embodiments of the present disclosure. Read message 620 is generated by the processor (or other component) that processes a packet 502 saved in shared buffer 300, 500. A buffer controller receives read message 620 and utilizes the contained information to update the completed count(s) 604 saved in memory entry fields. The buffer controller used to receive read message 620 may be operated by at least one processor, hardware logic, or software. The buffer controller used to receive read message 620 may be located on the chip (or other destination) operating shared buffer 300, 500 or external to the chip (or other destination) operating shared buffer 300, 500. Read message 620 contains the segment number 621 and straddle count 622 of the processed packet. This information can be determined from the corresponding write message 610 for the packet which also includes segment number 613 and straddle count 614. No other information is necessary to include in in read message 620. The controller then utilized the received read message 620 to identify and decrease the completed counts(s) 605 of segment(s) containing the processed packet 502. This is done is the same manner that the computing device utilized for identifying which completed counts(s) 605 to increment in response to the write message 610. As with write message 610, read message 620 is transient and the information it contains is not stored in memory field 600 and is only used to update completed count(s) 605.

For every received, stored, and processed packet 502, the write message 610, generated after storage in shared buffer 300, 500, increases a set of completed counts 605 and the read message 620, generated after processing from shared buffer 300, 500, decreases the same set of completed counts 605. This enables embodiments of the present disclosure to accurately track the receipt, storage, and processing of packet without storing per packet information in memory field 600. Instead of relying on packet level information, the segment level information completed counts 605, and in some embodiments also the max flag 604, are used to identify the portions of shared buffer 300, 500 that are "full" with packets 502 awaiting processing and "free" able to receive new packets 502.

Figure 7:
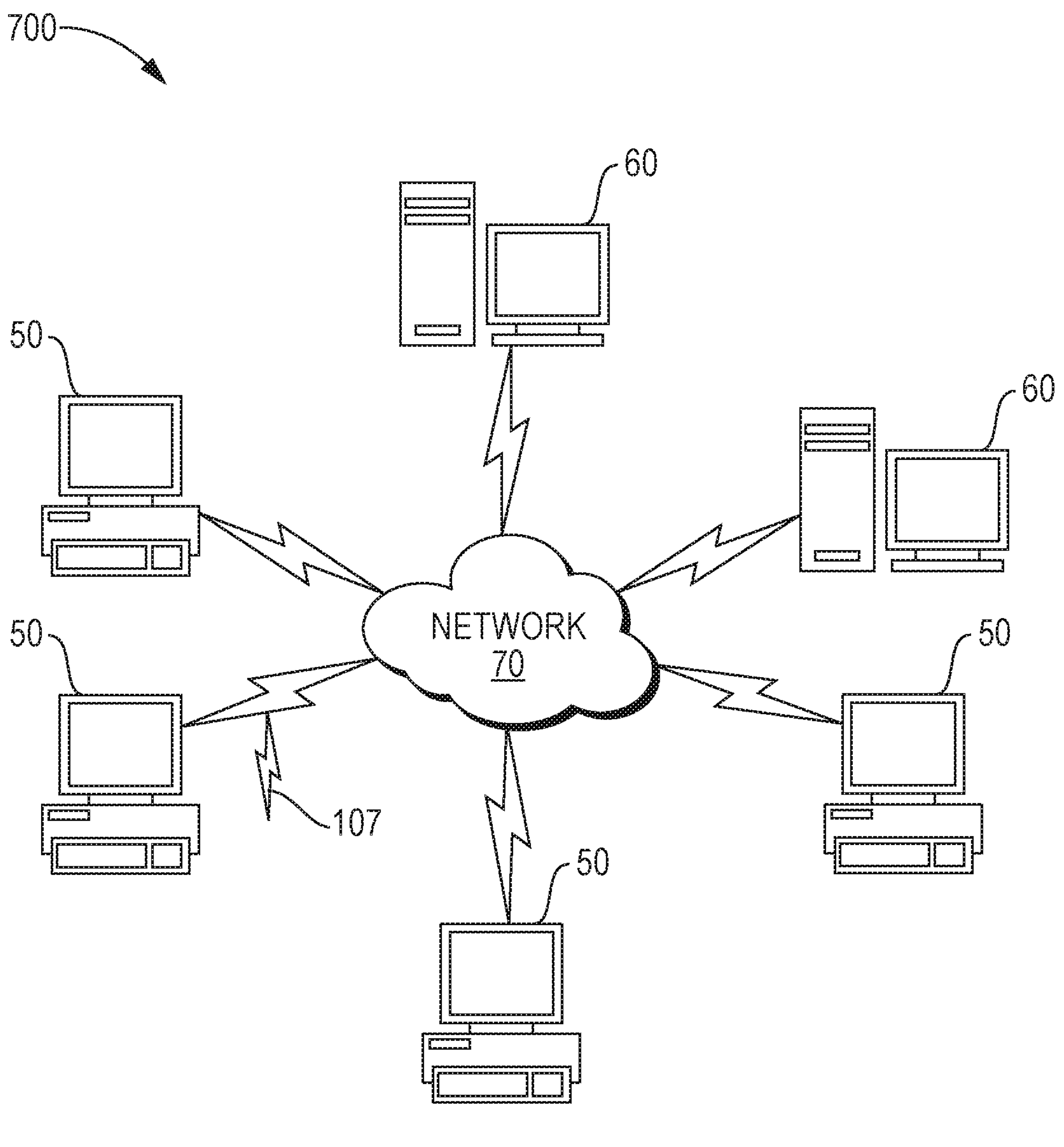
FIG. 7 is a schematic view of a computer network in which embodiments may be implemented.

FIG. 7 is a schematic view of a computer network 700 in which embodiments may be implemented. Computer network 700 may exchange data packets between its component computing devices and between components/applications of individual computing devices. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 8:
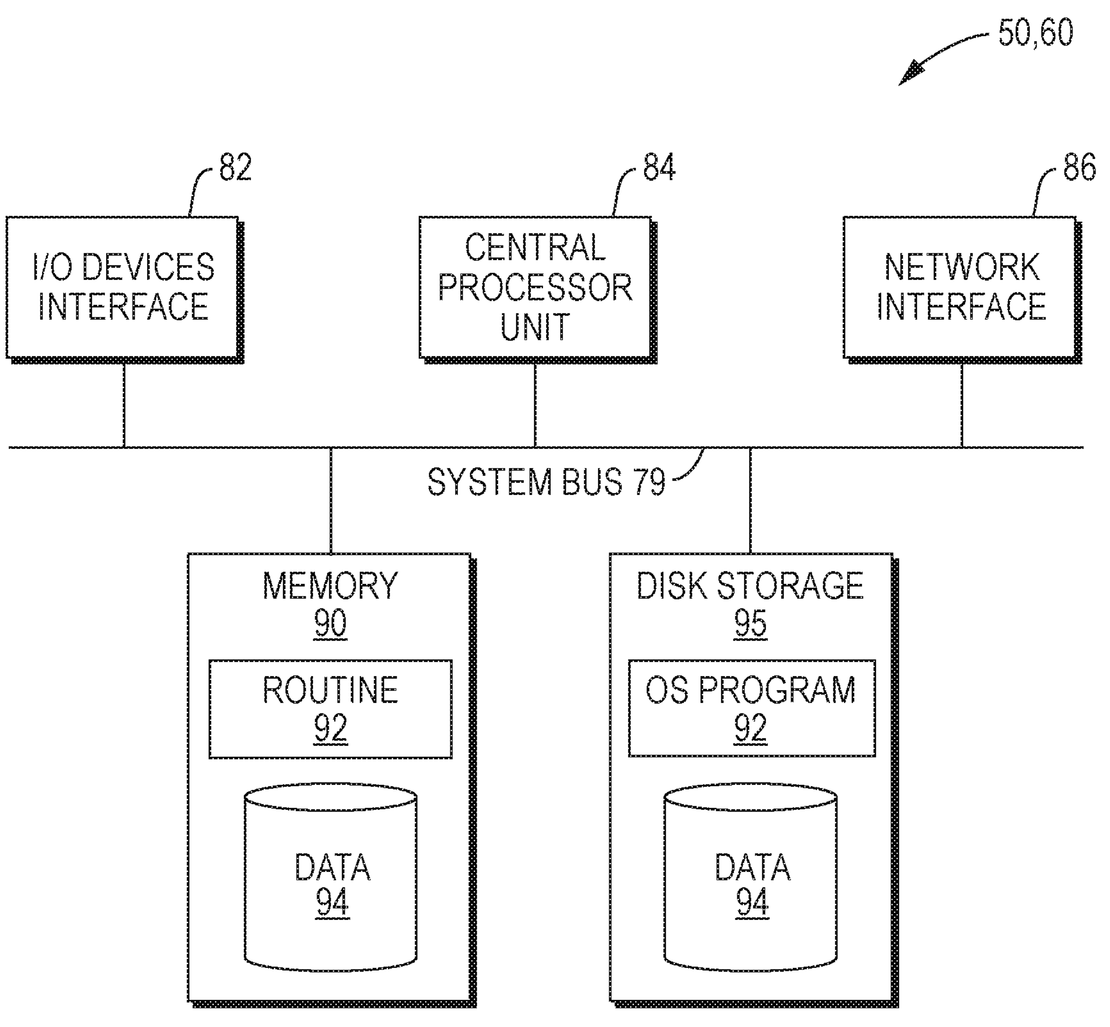
FIG. 8 is a block diagram of a computer node in the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 12). Memory 90 provides volatile storage for computer software instructions 92 and data 94 used to implement an embodiment of the present disclosure (e.g., shared buffer 300, 500, method 400, maintaining and updating memory field 600, generating read and write messages 610 and 620, memory). In some embodiments software instructions 92 may be implanted as hardware logic. Disk storage 95 provides non-volatile storage for computer software instructions 92 and data 94 used to implement an embodiment of the present disclosure. Central processor unit 84 is also attached to system bus 79 and provides for the execution of computer instructions. Central processor unit 84 may process the received packets stored in shared buffer 300, 500. Computers 50, 60 may contain multiple Central processor units 84.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computing device comprising:

a first storage area configured to temporarily store data packets consecutively, the first storage area divided into at least two segments;

a second storage area configured to store, for each of the at least two segments of the first storage area, a segment complete count, the segment complete count indicating if a corresponding segment contains unprocessed data packets;

a write controller configured to generate a write message when a data packet is stored in the first storage area and update segment complete counts of a first subset of the at least two segments, the first subset of the at least two segments selected based on where the data packet is stored in the first storage area; and a buffer controller configured to:

receive a read message when a data packet is processed from the first storage area and update segment complete counts of a second subset of the at least two segments, the second subset of at least two segments selected based upon where the data packet is processed from the first storage area; and update an address of a packet start read pointer located in a current segment to a subsequent segment when the segment complete count of the current section indicates that it does not contain unprocessed data packets.

2. The computing device of claim 1 wherein the second storage area is further configured to store, for each of the at least two segments, a flag; and the write controller is further configured:

to set the flag for a segment to full when a packet start write pointer crosses an end boundary of that segment; and delay updating the address of the packet start read pointer to the subsequent segment until the flag for the subsequent section is set to full.

3. The computing device of claim 2 wherein the buffer controller is further configured to clear the full flag for a segment when the segment complete count of that segment indicates that the segment does not contain unprocessed data packets.

4. The computing device of claim 1 wherein the write message comprises i) a packet start write pointer, ii) a length of the stored data packet, iii) a segment number identifying a segment containing a start of the stored data packet; and iv) a straddle count identifying a number of segments containing the stored data packet.

5. The computing device of claim 4 wherein the segment number and the straddle count of the stored data packet are calculated based upon the packet start write pointer and the length of the stored data packet.

6. The computing device of claim 1 wherein the read message comprises a segment number and a straddle count of the processed data packet.

7. The computing device of claim 1 wherein at least one of the write controller and buffer controller is a hardware controller.

8. The computing device of claim 1 wherein the second storage area is further configured to store a number of the at least two segments and a size of the at least two segments.

9. The computing device of claim 1 wherein the first storage area is configured to store data packets consecutively without any intervening empty space.

10. The computing device of claim 1 wherein the data packets are stored in, and processed from, the first storage area in first-in, first-out order.

11. A method for temporarily storing data packets, the method comprising:

consecutively storing, in a first storage area divided into at least two segments, received data packets;

storing, in a second storage area, for each of the at least two segments of the first storage area, a segment complete count, the segment complete count indicating if a corresponding segment contains unprocessed data packets;

generating, by a write controller, a write message when a data packet is stored in the first storage area;

updating, by the write controller, segment complete counts of a first subset of the at least two segments, the first subset of the at least two segments selected based on where the data packet is stored in the first storage area;

receiving, by a buffer controller, a read message when a data packet is processed from the first storage area;

updating, by the buffer controller, segment complete counts of a second subset of the at least two segments, the second subset of at least two segments selected based upon where the data packet is processed from the first storage area; and updating, by the buffer controller, an address of a packet start read pointer located in a current segment to a subsequent segment when the segment complete count of the current section indicates that it does not contain unprocessed data packets.

12. The method of claim 11 wherein the second storage area is further configured to store, for each of the at least two segments, a flag, the method further comprising:

setting, by the write controller, the flag for a segment to full when a packet start write pointer crosses an end boundary of that segment; and delaying the updating of the address of the packet start read pointer to the subsequent segment until the flag for the subsequent section is set to full.

13. The method of claim 12 further comprising clearing, by the buffer controller, the full flag for a segment when the segment complete count of that segment indicates that the that segment does not contain unprocessed data packets.

14. The method of claim 11 wherein the write message comprises i) a packet start write pointer, ii) a length of the stored data packet, iii) a segment number identifying a segment containing a start of the stored data packet; and iv) a straddle count identifying a number of segments containing the stored data packet.

15. The method of claim 11 wherein the read message comprises a segment number and a straddle count of the processed data packet.

16. The method of claim 11 wherein the write controller and buffer controller are hardware controllers.

17. The method of claim 11 wherein data packets are stored consecutively without any intervening empty space in the first storage area.

18. The method of claim 11 wherein the data packets are stored in, and processed from, the first storage area in first-in, first-out order.

19. The method of claim 11 wherein the first storage area is a buffer that stores the received packets before they are processed.

20. A computing device comprising:

means for temporarily storing packets consecutively in a first storage area divided into at least two segments;

means for storing, in a second storage area, for each of the at least two segments of the first storage area, a segment complete count, the segment complete count indicating if a corresponding segment contains unprocessed data packets;

means for generating a write message when a data packet is stored in the first storage area and updating segment complete counts of a first subset of the at least two segments, the first subset of the at least two segments selected based where the data packet is stored in the first storage area;

means for receiving a read message when a data packet is processed from the first storage area and updating segment complete counts of a second subset of the at least two segments, the second subset of at least two segments selected based upon where the data packet is processed from the first storage area; and means for updating an address of a packet start read pointer located in a current segment to a subsequent segment when the segment complete count of the current section indicates that it does not contain unprocessed data packets.

* * * * *